United States Patent
Olaleye et al.

(10) Patent No.: US 10,804,737 B2
(45) Date of Patent: Oct. 13, 2020

(54) MOBILITY PATTERN AND CONNECTED LIGHTING BASED SYSTEM FOR SMART GRID RESOURCE PLANNING AND ENERGY MANAGEMENT

(71) Applicant: SIGNIFY HOLDING B.V., Eindhoven (NL)

(72) Inventors: Olaitan Philip Olaleye, Wakefield, MA (US); Talmai Brandao De Oliveira, North Andover, MA (US); Sirisha Rangavajhala, Wakefield, MA (US); Abhishek Murthy, Arlington, MA (US); Jasleen Kaur, Melrose, MA (US); Rohit Kumar, Hackensack, NJ (US); Hassan Mohanna, Quincy, MA (US); Alexandru Darie, Lincoln, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/348,473

(22) PCT Filed: Nov. 16, 2017

(86) PCT No.: PCT/EP2017/079379
§ 371 (c)(1),
(2) Date: May 8, 2019

(87) PCT Pub. No.: WO2018/091561
PCT Pub. Date: May 24, 2018

(65) Prior Publication Data
US 2019/0273395 A1    Sep. 5, 2019

Related U.S. Application Data

(60) Provisional application No. 62/423,264, filed on Nov. 17, 2016.

(30) Foreign Application Priority Data

Dec. 13, 2016    (EP) .................................. 16203820

(51) Int. Cl.
*H02J 13/00*    (2006.01)
*G05F 1/66*    (2006.01)
(Continued)

(52) U.S. Cl.
CPC ............ *H02J 13/0079* (2013.01); *G05F 1/66* (2013.01); *G06Q 10/06* (2013.01); *G06Q 50/06* (2013.01);
(Continued)

(58) Field of Classification Search
CPC .... H02J 13/00; H02J 3/38; G05F 1/66; G06Q 50/06
See application file for complete search history.

(56) References Cited

U.S. PATENT DOCUMENTS

| 2010/0100253 A1 | 4/2010 | Fausak et al. |
| 2012/0181864 A1* | 7/2012 | Honma .................. H02J 3/381 307/23 |

(Continued)

FOREIGN PATENT DOCUMENTS

| EP | 2858015 A1 | 4/2015 |
| WO | 2013144756 A2 | 10/2013 |

(Continued)

*Primary Examiner* — Vincent H Tran
(74) *Attorney, Agent, or Firm* — Daniel J. Piotrowski

(57) ABSTRACT

The described embodiments relate to systems, methods, and apparatuses for controlling energy resources available to micro-grids of a city based on mobility patterns of people moving within the micro-grids. The mobility patterns can be identified using a network of sensors within each micro-grid for collecting data related to the movement of people within the micro-grids. The mobility patterns can be used to estimate energy demand for each micro-grid and prioritize the (Continued)

energy demands to determine the energy resources that would be suitable for supplying power to each micro-grid. This allows for micro-grids to dynamically and efficiently change their power sources according to predictions about the movement of people within the micro-grids.

15 Claims, 6 Drawing Sheets

(51) Int. Cl.
    *G06Q 10/06*     (2012.01)
    *G06Q 50/06*     (2012.01)
    *H02J 3/38*     (2006.01)
    *H02J 3/00*     (2006.01)

(52) U.S. Cl.
    CPC .................. *H02J 3/00* (2013.01); *H02J 3/38* (2013.01); *H02J 3/003* (2020.01); *H02J 2203/20* (2020.01)

(56) References Cited

U.S. PATENT DOCUMENTS

| | | | |
|---|---|---|---|
| 2012/0239213 A1* | 9/2012 | Nagata | G06Q 50/06 700/291 |
| 2015/0102747 A1 | 4/2015 | Wang et al. | |
| 2019/0011283 A1* | 1/2019 | Soutar | H04L 67/04 |

FOREIGN PATENT DOCUMENTS

| | | |
|---|---|---|
| WO | 2014016729 A1 | 1/2014 |
| WO | 2014147524 A1 | 9/2014 |

\* cited by examiner

MOBILITY PATTERN AND CONNECTED LIGHTING BASED SYSTEM FOR SMART GRID RESOURCE PLANNING AND ENERGY MANAGEMENT

CROSS-REFERENCE TO PRIOR APPLICATIONS

This application is the U.S. National Phase application under 35 U.S.C. § 371 of International Application No. PCT/EP2017/079379, filed on Nov. 16, 2017, which claims the benefit of U.S. Provisional Patent Application No. 62/423,264, filed Nov. 17, 2016 and European Patent Application No. 16203820.2, filed on Dec. 13, 2016. These applications are hereby incorporated by reference herein.

TECHNICAL FIELD

The present invention is directed generally to energy management using mobility patterns of people. More particularly, various methods and apparatus disclosed herein relate to tracking mobility patterns of people to predict energy demands and identify energy sources suitable for particular mobility patterns.

BACKGROUND

Energy demands for a city can change rapidly according to a variety of predictable and unpredictable conditions. Oftentimes, when an unpredictable spike in energy demand occurs, the energy provided to the city from a power source can come at a higher cost because more energy is wasted ramping up the energy available at the power source. Moreover, many cities have no other choice but to pay these costs, even when the spikes are predictable, because their infrastructure does not provide for the ability to switch between power sources.

SUMMARY

The present disclosure is directed to inventive methods and apparatus for controlling energy resources available to micro-grids. The energy resources can be controlled based on mobility patterns of people within the micro-grids. Generally, in one aspect, a method for powering a micro-grid based on a mobility pattern of persons moving in the micro-grid may include: predicting the mobility pattern of a population of people in the micro-grid of a city; estimating an energy requirement for the micro-grid based at least on the predicted mobility pattern; identifying an energy resource suitable for satisfying the energy requirement of the micro-grid during a time corresponding to the mobility pattern; and causing the identified energy resource to power the micro-grid during the time corresponding to the predicted mobility pattern.

In some embodiments, the method may further include receiving sensor data from a network of luminaires located within the micro-grid. In some embodiments, the mobility pattern may be predicted using the sensor data and the micro-grid may be a power system in a building located in the city. In some embodiments, the predicted mobility pattern may be an instantaneous mobility pattern associated with a disruptive event that is predicted by the computing device using data available to the computing device, and the identified energy resource may be a renewable energy resource. In some embodiments, the instantaneous mobility pattern may correspond to a period when the population of the micro-grid increases and then decreases.

In some embodiments, the method may further include: predicting mobility patterns of populations of people in multiple micro-grids of the city; estimating energy requirements for the multiple micro-grids based on the predicted mobility patterns; and ranking the estimated energy requirements for the multiple micro-grids. In some embodiments, the method may further include selecting, based on the ranking, energy resources to fulfill the energy requirements for the multiple micro-grids. In some embodiments, the mobility pattern of the population may be predicted based at least in part on: call detail records received from one or more telecommunications providers, or sensor data transmitted by sensors connected to a network of luminaires.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
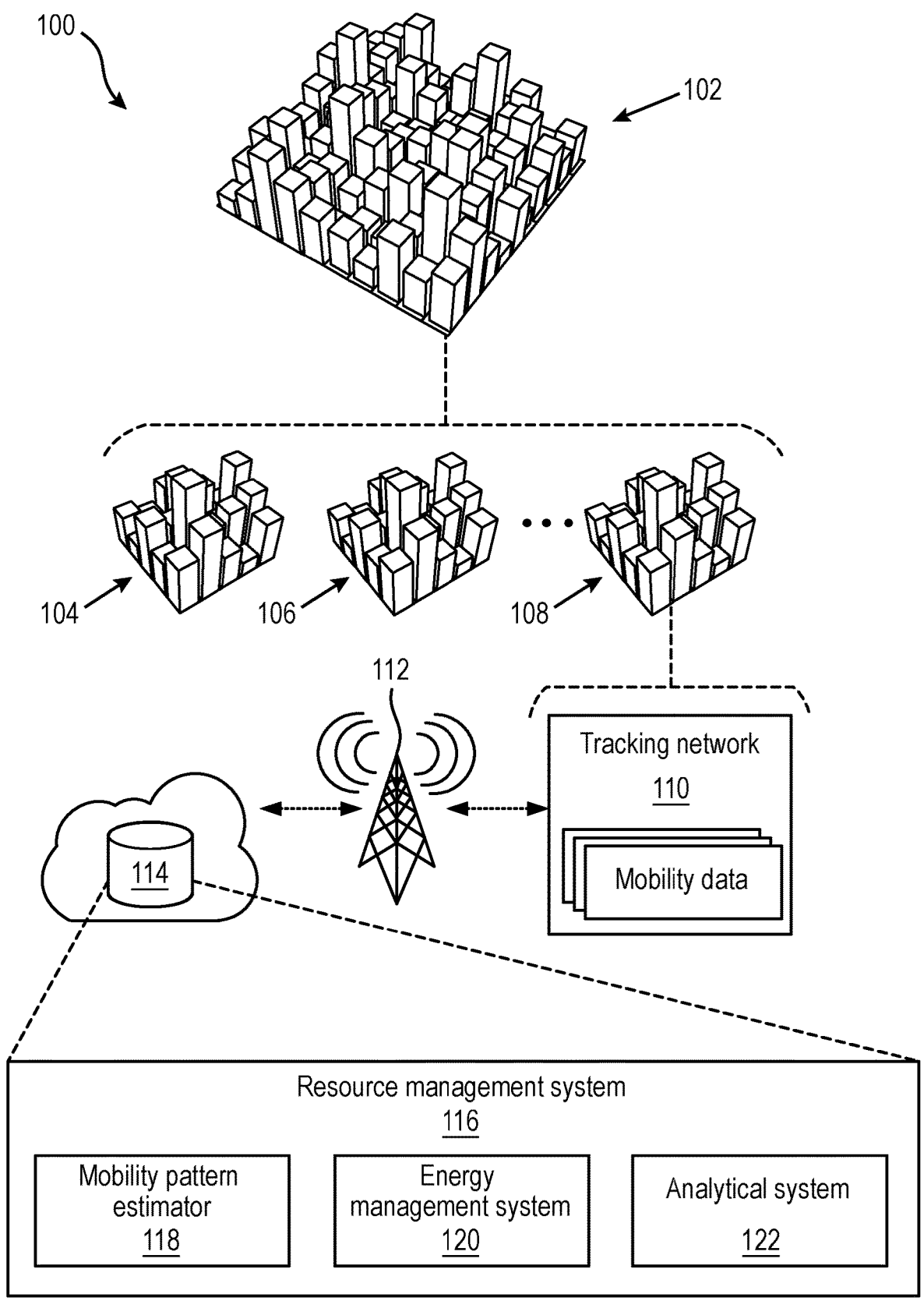
FIG. 1 illustrates a system diagram that details how a resource management system of a city can use population mobility data to make a more efficient use of various energy sources available to the city.

The described embodiments relate to systems, methods, and apparatuses for supplying power to a load according to mobility patterns of persons residing in a geographical area associated with the load. Specifically, the embodiments set forth allow micro-grids, buildings, sections, or any other area of a city to switch between power sources according to predicted mobility patterns of persons occupying the respective location. Energy demand of a micro-grid can be predicted by creating demand profiles that are based on load curves exhibited by the micro-grid. Typically, the movement of people within an area of the micro-grid is directly related to the load curves, as people typically require lighting and powered devices to perform everyday tasks. In order to more accurately predict the load curves of a micro-grid, data related to the mobility for persons in different micro-grids of a city can be analyzed to find patterns. These patterns can provide insights for further optimizing a micro-grid's energy requirements, as well as an entire city's energy requirements. It should be noted that a micro-grid as referred to herein can refer to a section of a power grid of a city, a power system of a building, a power system of a floor of a building, a power system of an area within a city or building, and/or any other connection of power consuming loads.

Energy requirements for a micro-grid can be inferred from assessing the demand for lighting based on the mobility patterns of persons through a geographic area of the micro-grid. As lighting demand changes, patterns can be identified and characterized according to the type of demand change. For example, a demand for energy can be instantaneous, dynamic, and/or static over time. Additionally, demand can be inferred by collecting data on a person to person level, a building to building level, a floor to floor level, and/or any other level of detail for assessing energy demand. The collected data can detail how long a person stays in a particular location or building, how often a person changes locations within the city, when a person changes locations within the city, occupancy of buildings and/or locations within the city, and/or any other data relevant to mobility of persons within a city. The collected data can include anonymized bulk data from one or more sources such as cell data records (also referred to as "call detail records," or "CDRs"), outdoor cameras, indoor cameras, spectrometers, vehicle tracking logs, surveys, global positioning system (GPS) logs, and/or any other source of data suitable for indicating a pattern of mobility of persons in an area. Some of this data (particularly CDRs) may be obtained through partnerships with one or more telecommunication providers that provide service to the area. Furthermore, the collected data can include anonymized personal data such as phone GPS logs, personalized tracking device data, facial tracking data, and/or any other personal data that can be collected by observing persons moving within a city.

Once the collected data has been analyzed and a mobility and/or a density pattern of persons has been identified, an energy demand curve can be estimated for an area associated with the collected data. The demand curve can then be matched with an energy resource that is suitable for supplying power according to the demand curve. Examples of energy sources can include solar arrays, wind mills, tidal power, fossil fuels, nuclear, battery, and/or any other power source suitable for powering portions of a city. When a predicted mobility pattern is to occur in a micro-grid of a city, a demand curve for that mobility pattern can be identified, and an energy source suitable for the demand curve can be selected to power the micro-grid. Furthermore, energy sources can be prioritized over multiple micro-grids of a city in order to give priority to micro-grids that have a denser population at a particular time. In this way, cities where the population has similar and predictable commuting habits can effectively use different energy resources and see a reduction in overall energy costs.

In some embodiments, the system responsible for the dynamic energy resource usage can predict and control energy demand for major events where a large influx of people causes a change in regular commuting patterns. The system can predict a major event and a demand curve for the major event, and select one or more energy courses to employ as a power supply during the major event. For example, an energy source, such as a solar array, can typically provide energy to a charge storage device. However, during a time of a major event, the solar array can be tasked with providing energy to an affected micro-grid during the major event, rather than charging the charge storage device. In this way, less dependency can be placed on a fossil fuel power source during such major events. The event can be predicted using public data available to the system a network connection. For example, a major event such as a disruptive weather event can be predicted using weather data that is available from a weather server. Furthermore, a major event such as a sporting event that encourages the movement of people to a city can be predicted using social media data that is available to the system through a social media server or personal device of one or more persons.

The system set forth herein can be a computing device having a resource management system that includes a mobility pattern estimator. The mobility pattern estimator can collect data associated with mobility patterns of persons or objects within different target locations in a city (or more generally, a geographic area). The data can be collected for one or more target locations and scaled in order to provide an estimate for mobility patterns across an entire city. Data such as stay occupancy durations, transient patterns, and information about the movement of certain objects such as public transit can be used as indicators for particular patterns. The resource management system can further include an analytical system. The analytical system can extract insights from the mobility pattern estimator for providing data about energy demand for various locations. For example, the analytical system can determine lighting requirements for a particular location based on the mobility pattern of persons in that location, and use the lighting data to estimate the energy demand for the particular location. Furthermore, the analytical system can help to perform resource matching and parameterize the mobility patterns for use by an energy management system of the resource management system. Lighting requirements can be based on data related to disruptive events that can affect the lighting of a micro-grid of a city. Once a disruptive event is predicted, the system can estimate a lighting requirement for one or more areas of a city that are affected. The system can then select an energy resource for the affected micro-grid to power or supplement the power to the micro-grid to assist the micro-grid during the disruptive event.

The energy management system can interface with the analytical system and use data from the mobility pattern estimator for managing energy allocation for various micro-grids in a city. The energy management system can forecast lighting and energy requirements using data from the analytical system and/or the mobility pattern estimator. Additionally, the energy management system can directly or indirectly control the switching of one or more micro-grids between different energy sources. Furthermore, the resource management system can be connected to an interconnected group of luminaires. The luminaires can be located in the micro-grids managed by the resource management system and can include sensors for tracking mobility data for the resource management system. The luminaires can be modified by the resource management system to meet the energy goals set forth by the energy management system.

FIG. 1 illustrates a system diagram 100 that details how a resource management system 116 of a city 102 can use population mobility data to make a more efficient use of various energy sources available to the city 102. The city 102 can include a power distribution system that can be divided into multiple micro-grids, such as a first micro-grid 104, a second micro-grid 106, and an n-micro-grid 108, where "n" is any whole number total of micro-grids for a given city. Each n-micro-grid 108 can be connected to a power source that can also be connected to other micro-grids of the city 102. Additionally, each n-micro-grid 108 can be connected to one or more power sources that can be the same or different than a power source of another micro-grid of the city 102. Each n-micro-grid 108 can include a tracking network 110 that collects mobility data using sensors that are connected throughout the n-micro-grid 108. The mobility data can correspond to the movement of persons in, out, and through a micro-grid. For example, the n-micro-grid 108 can include a network of luminaires that include sensors that track the movement of people near each luminaire in the network of luminaires. The luminaires can be indoor and/or outdoor lighting in order to gauge the movement and density of populations in and out of buildings in a particular micro-grid. Because people typically use a variety of power consuming devices wherever they go, the mobility data related to the movement of people within a micro-grid can be indicative of the power requirements for that particular micro-grid. Additionally or alternatively, mobility patterns may be determined from data (e.g., CDRs) obtained from one or more telecommunication providers that service the area.

The mobility data can be transmitted over a network 112, such as a private network or public network (e.g., the internet) to one or more computing devices 114 having a processor and memory for controlling a resource management system 116. The resource management system 116 can use the mobility data to make decisions about how each micro-grid of the city 102 is to be powered. The resource management system 116 can include a mobility pattern estimator 118, an energy management system 120, and an analytical system 122. The mobility pattern estimator 118 can use the mobility data to identify patterns in the movement of persons including locations, stay durations, transient patterns, and/or any other aspect of movements through a micro-grid. The mobility pattern estimator 118 can parameterize the mobility data in order that other systems of the resource management system 116 can use the mobility data to make decisions for the micro-grid. Additionally, mobility data about a particular building or location within a micro-grid can be scaled in order to make estimates for the entire micro-grid without having to collect mobility data for all locations within the micro-grid.

The analytical system 122 of the resource management system 116 can use data from the mobility pattern estimator 118 to match mobility patterns with energy resources available to each micro-grid. The analytical system 122 can develop a set of common mobility patterns such as an instantaneous pattern, a dynamic pattern, and a static pattern. In some embodiments, the analytical system 122 can operate a supervised or unsupervised machine learning algorithm where each pattern is identified using the machine learning algorithm. As a result, future mobility data can be classified under each identified pattern. Each identified pattern can be matched with one or more energy resources that are suitable for providing power during times when such patterns are exhibited by persons in a micro-grid. The patterns can be matched to energy resources using the energy management system 120 of the resource management system 116. The energy management system 120 can interface with the analytical system 122 in order to forecast energy requirements for a particular micro-grid and select a suitable energy source for the micro-grid. The energy management system 120 can include or connect to a backend system responsible for switching the energy sources of each micro-grid. The energy management system 120 can create schedules for energy resources based on the mobility patterns of persons within a particular micro-grid. For example, the energy management system 120 can employ a first energy resource during a first period of a mobility pattern and a second energy resource during a second period of a mobility pattern.

A selection of a particular energy resource during a particular mobility pattern can depend on a density gradient of persons in a location of a micro-grid. For example, a first energy resource such as fossil fuels can be suitable for dense areas where a population is static and a second energy resource such as battery power may be suitable for dense areas where a population will only briefly reside. Schedules for connecting energy resources to micro-grids can be delayed in real time based on events that occur at or near the micro-grid. For example, the tracking network 110 can provide traffic data to the resource management system 116. The traffic data can indicate that the arrival of people to the n-micro-grid 108 will be delayed compared to other days. In response, the resource management system 116 can delay the connection of an energy resource to the n-micro-grid 108. Furthermore, the resource management system 116 can extend the connection of the energy resource to the n-micro-grid 108 because the late arrival of people to the n-micro-grid 108 can indicate that those people will stay longer and therefore consume energy later than other days.

Figure 2A:
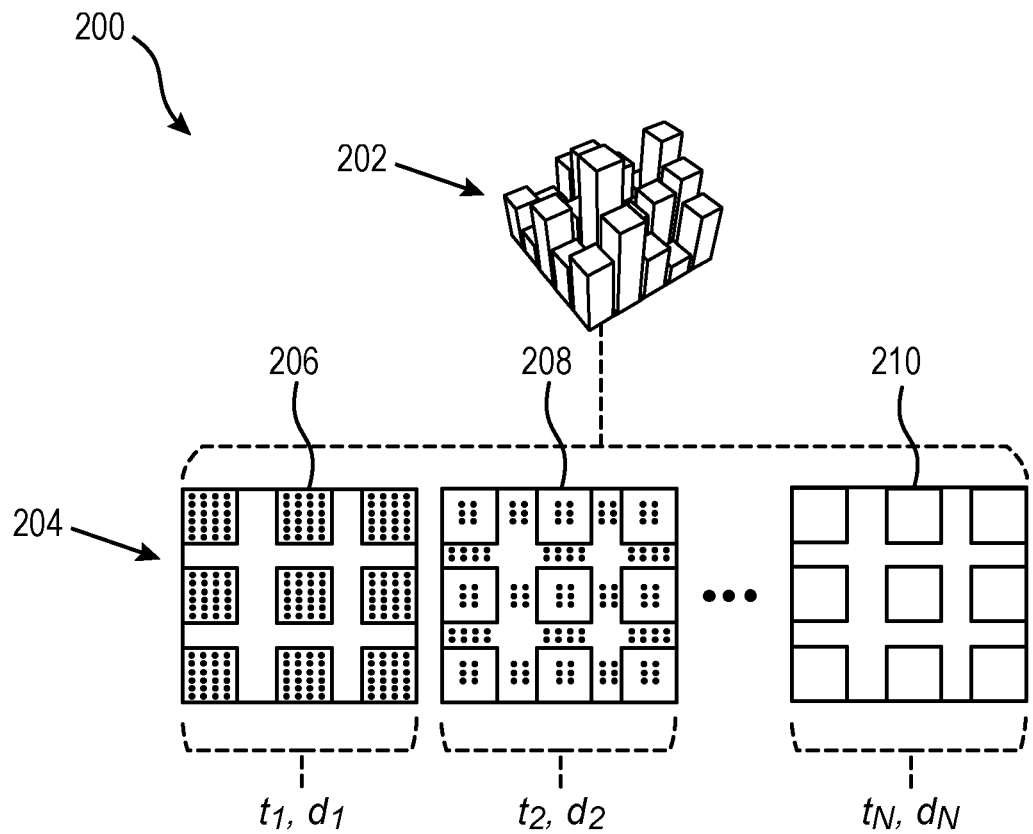
FIGS. 2A and 2B illustrate how mobility data can be parameterized and used to identify patterns in the movement of persons within a micro-grid.
Figure 2B:
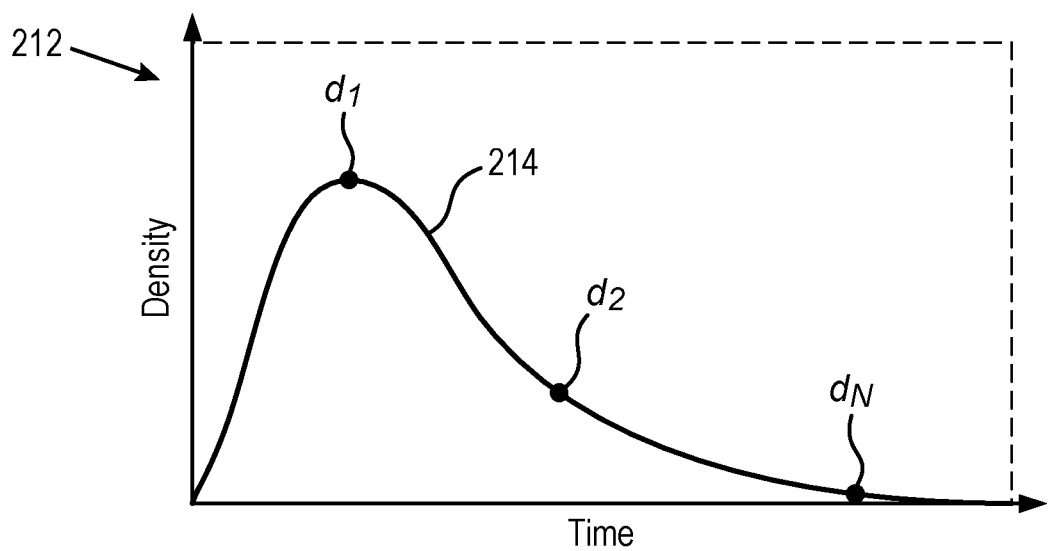

FIGS. 2A and 2B illustrate how mobility data can be parameterized and used to identify patterns in the movement of persons within a micro-grid 202. Specifically, FIG. 2A illustrates a diagram 200 of a micro-grid 202 having a population density that changes over time. The micro-grid 202 can correspond to a commercial area 204 whose population changes over time. For example, a first snapshot 206 of the commercial area 204 can be at time $t_1$ where the residents of the commercial area 204 are located inside of each building. It should be noted that each square in the first snapshot 206 can represent a building and each dot or point within each building can represent a person or group of persons. The first snapshot 206 can correspond to night time when people leave work and briefly go to commercial area 204 for dinner or shopping. Therefore, at time $t_1$, the micro-grid 202 can have a peak density $d_1$. A second snapshot 208 can correspond to a late evening time when some of the persons are leaving the commercial buildings and entering the streets (the areas between the buildings). The second snapshot 208 can correspond to a time $t_2$ that is later than time $t_1$, and a density $d_2$ that is less than the density $d_1$. A third snapshot 210 can correspond to an early morning time when the commercial area 204 is closed and the people are in another micro-grid. The third snapshot 210 can correspond to a time $t_N$ after times $t_1$ and $t_2$, and a density $d_N$ that is less than densities $d_1$ and $d_2$.

FIG. 2B illustrates a plot 212 that provides an illustration of a mobility pattern of persons within a micro-grid of a city. Specifically, plot 212 provides a trend 214 of density over time for a period of time in the micro-grid 202. The resource management system 116 discussed herein can correlate the trend 214 with a mobility pattern in order to select an energy resource for powering the micro-grid during the time that the trend 214 is occurring. For example, the trend 214 can correspond to an instantaneous mobility pattern. The analytical system 122 of the resource management system 116 can correlate the instantaneous mobility pattern with a renewable resource such as solar power or windmill power, or a charge storage device such as a battery or a capacitor. The correlated power source can then be used to power the micro-grid 202 during the time of the trend 214, as well as subsequent periods when the trend 214 is predicted to be exhibited by the micro-grid 20. In some embodiments, the analytical system 122 can also choose a power source to power the micro-grid 202 toward the end of the trend 214 or after the trend 214 has completed. For example, because the density at the end of the trend 214 is close to a negligible value, the analytical system 122 can choose a different energy source to power the micro-grid 202 at the latter half of the trend 214. The analytical system 122 can select a base station power supply that is powered from fossil fuels in order to encourage a decrease in the average power consumed from fossil fuels. By maintaining a lower average power and not using fossil fuels during instantaneous mobility patterns, the cost of fossil fuels associated with the micro-grid 202 can be minimized. Furthermore, the analytical system 122 can cause any charge storage devices to be recharged during the latter portion of the trend 214 and the energy source for recharging can depend on which energy source is being used to power the micro-grid 202 after the trend 214. For example, if a fossil fuel power source is being used to power the micro-grid 202 after the trend 214 is over, a solar power source can be used to recharge the charge storage device.

Figure 3:
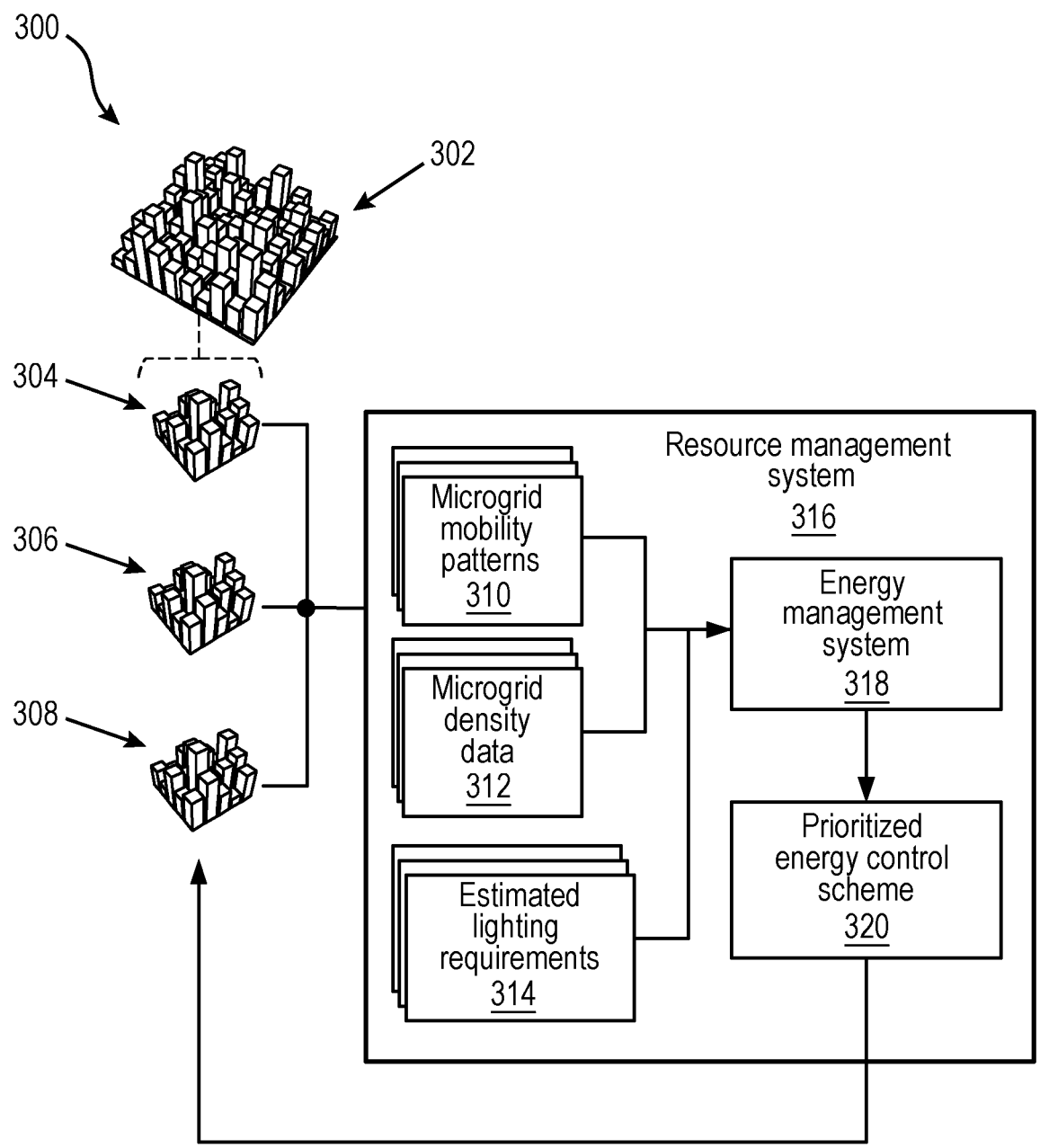
FIG. 3 illustrates a system diagram of an embodiment of a resource management system that can provide a prioritized energy control scheme based on mobility patterns of persons in a micro-grid.

FIG. 3 illustrates a system diagram 300 of an embodiment of a resource management system 316 that can provide a prioritized energy control scheme 320 based on mobility patterns of persons in a micro-grid. Specifically, system diagram 300 shows a city 302 that includes a first micro-grid 304, a second micro-grid 306, and a third micro-grid 308. Each micro-grid can provide data to the resource management system 316. The data can include information related to the density and movement of populations through each respective micro-grid. The resource management system 316 can use the data from the micro-grids to identify micro-grid mobility patterns 310 and generate micro-grid density data 312. Additionally, the data from the micro-grids can be used by the resource management system 316 to provide estimated lighting requirements 314. The estimated lighting requirements 314 can refer to an amount of light that would be sufficient to provide visibility for persons occupying each respective micro-grid. For example, if at a given time the first micro-grid 304 has a larger population than the second micro-grid 306, the first micro-grid 304 will need more light than the second micro-grid 306. Therefore, the estimated lighting requirements 314 will designate the first micro-grid 304 as needing a larger lighting requirement than the second micro-grid 306.

The micro-grid mobility patterns 310, the micro-grid density data 312, and/or the estimated lighting requirements 314 can be used by an energy management system 318 to create a prioritized energy control scheme 320. The prioritized energy control scheme 320 can include data for assigning an energy resource to a micro-grid according to a priority determined by the energy management system 318. Furthermore, each energy resource, such as wind, solar, tidal, fossil fuel, nuclear, and/or any other energy resource can be assigned to a micro-grid according to priority. For example, a micro-grid that has the highest population during the day time can be given priority to a solar energy resource, given that solar energy is typically generated during the day time. Furthermore, a micro-grid having the highest population during the night time can be given priority to an energy resource that is most readily available during the night time, such as a battery or a fossil fuel energy source.

The resource management system 316 can generate multiple prioritized energy control schemes 320 over time in order to change the priority of energy resources as the data from the micro-grids changes. For example, the first micro-grid 304 can be given priority to a solar energy resource during the morning when the first micro-grid 304 is experiencing an instantaneous, high density, mobility pattern and the second micro-grid 306 is experiencing a low density dynamic mobility pattern. In the afternoon, the second micro-grid 306 can experience an instantaneous, high density, mobility pattern and be given priority to the solar energy resource.

Figure 4:
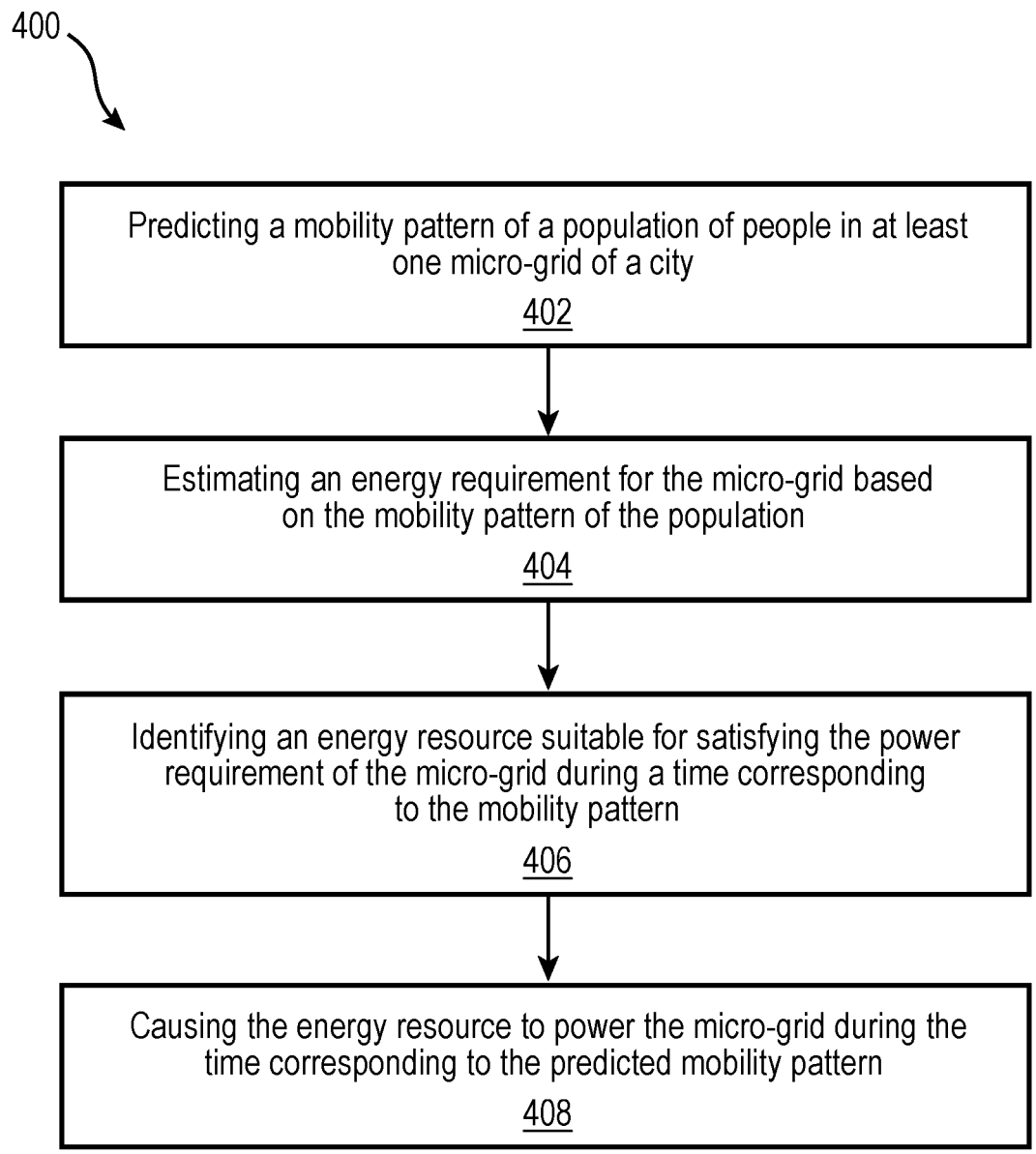
FIG. 4 illustrates a method for assigning an energy source to a micro-grid of a city based on a mobility pattern of a population in the micro-grid.

FIG. 4 illustrates a method 400 for assigning an energy source to a micro-grid of a city based on a mobility pattern of a population in the micro-grid. The method 400 can be performed by the resource management system 116, resource management system 316, and/or any other system, apparatus, or device discussed herein. The method 400 can begin at block 402 where a mobility pattern of a population in at least one micro-grid of a city is predicted. The mobility pattern can be based on tracking data acquired by sensors located within the micro-grid. The sensor can include motion sensors, heat sensors, cameras, weight sensors, microphones, and/or any other sensors suitable for tracking the motion of a person. The method 400 can also include block 404 where an energy requirement for the micro-grid is estimated based on the mobility pattern of the population. The mobility pattern can correspond to one or more patterns of population flow through the micro-grid. For example, the mobility pattern can be instantaneous, dynamic, or static. An instantaneous pattern can include a sharp rise in a number of people into a location of the micro-grid followed by a sharp decline in the number of people in the location. A static pattern can include a steady or constant number of people in a location of the micro-grid for a period of time. A dynamic pattern can include a constantly changing number of people, or a number of people that changes more over time than the static pattern. For example, a static pattern can correspond to a pattern where the number of people in a location remains within a tolerance of a constant value of people (e.g., N people with a tolerance of X %, where N is any positive whole number and X is any positive number). The dynamic pattern can correspond to a pattern where the number of people in a location moves in and out of the tolerance of the static pattern multiple times. At block 406 of method 400, an energy resource suitable for satisfying the power requirement of the micro-grid during a time corresponding to the mobility pattern is identified. Identifying a suitable energy resource for the mobility pattern can be performed using a neural network that has been trained to optimize the use of various energy resources for powering a micro-grid. Alternatively, identifying a suitable energy resource can be performed using a lookup table that provides a correlation between different mobility patterns and different energy resources. At block 408 of method 400, the identified energy resource is caused to power the micro-grid grid during the time corresponding to the mobility pattern. For example, if the resource management system predicts an instantaneous mobility pattern for the next morning, the resource management system can cause a renewable energy source to power the micro-grid the following morning.

Figure 5:
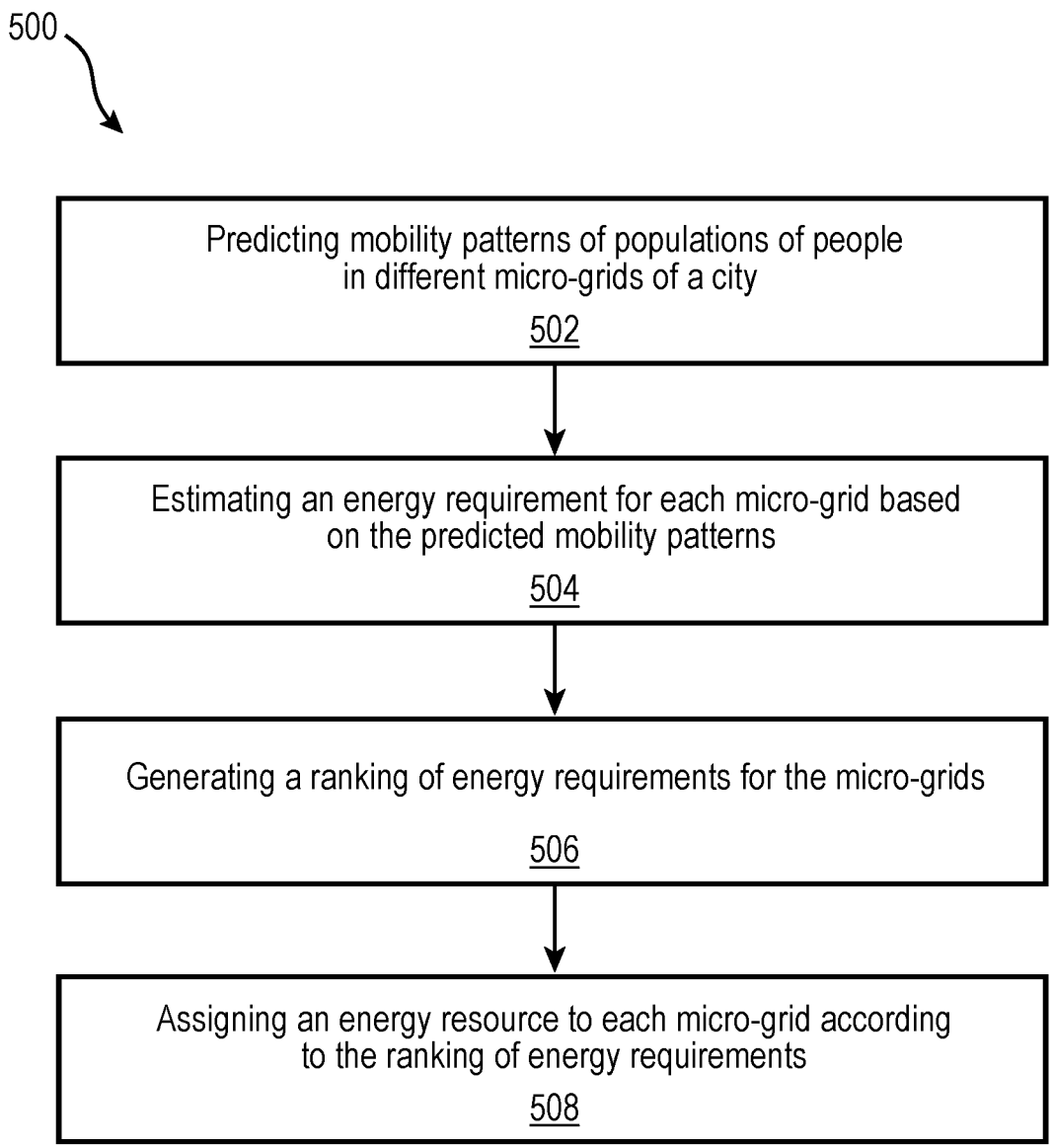
FIG. 5 illustrates a method for assigning energy resources to different micro-grids of a city based on a ranking of the energy resources.

FIG. 5 illustrates a method 500 for assigning energy resources to different micro-grids of a city based on a ranking of the energy resources. The method 500 can be performed by the resource management system 116, resource management system 316, and/or any other system, apparatus, or device discussed herein. The method 500 can include block 502 where mobility patterns of populations of people in different micro-grids of a city are predicted. At block 504, an energy requirement for each micro-grid is estimated based on the predicted mobility patterns. The energy requirement can be based on a lighting requirement for providing visibility to the people in the micro-grid. Furthermore, data for estimating the energy requirement can be provided by networks of luminaires that have sensors for detecting the movement of people within the micro-grids. At block 506, a ranking of energy requirements for the micro-grids is generated. The ranking can be a list of data representing total estimated power consumption for each micro-grid. A micro-grid that is estimated to require the most power for a period corresponding to the mobility pattern can be assigned the highest priority. At block 508, an energy resource is assigned to each micro-grid according to the ranking of energy requirements. In this way, energy resources that can more readily provide power to micro-grids needing the most power will be selected to provide power to those micro-grids.

Figure 6:
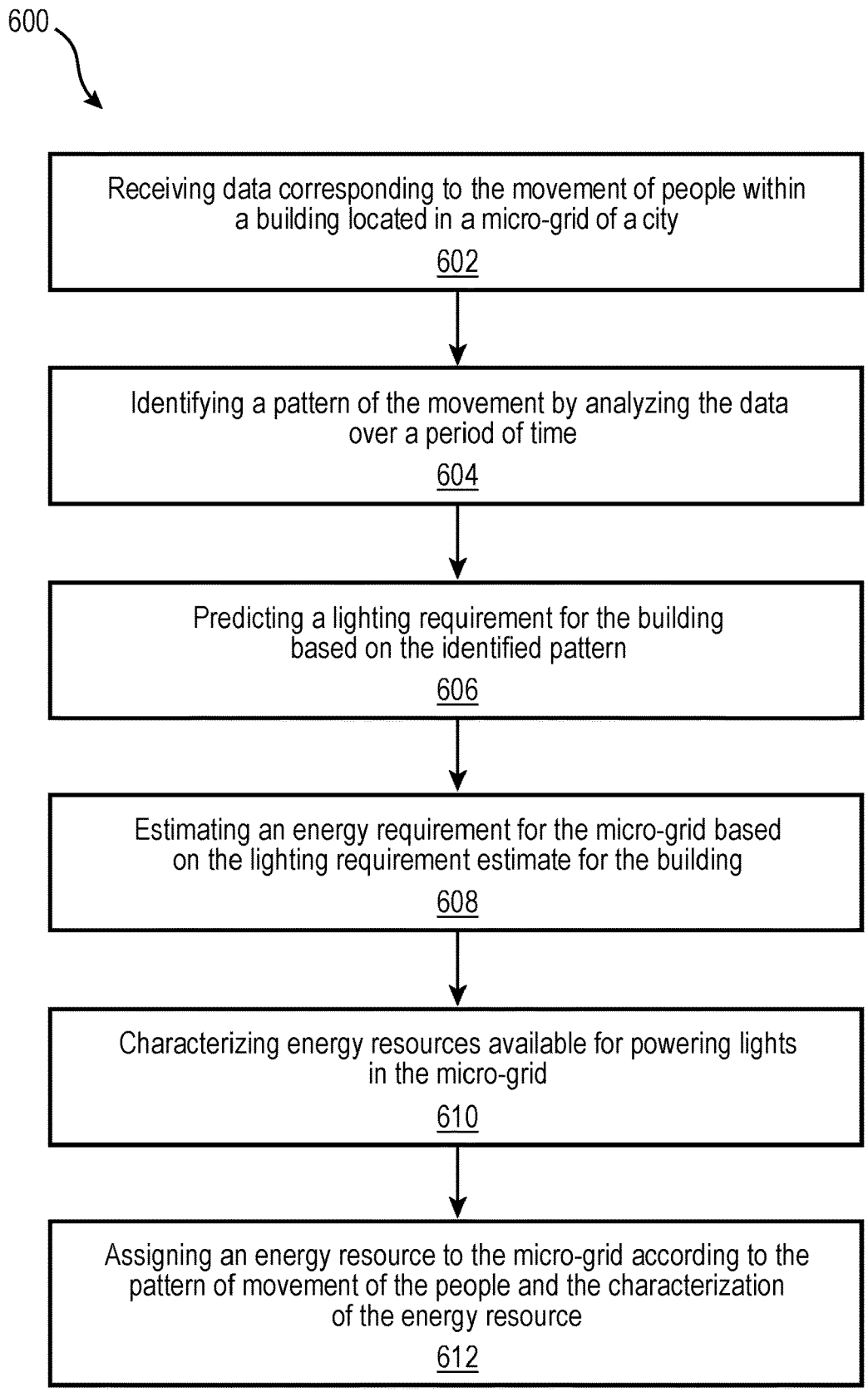
FIG. 6 illustrates a method for assigning energy resources to micro-grids using lighting requirement data.

FIG. 6 illustrates a method 600 for assigning energy resources to micro-grids using lighting requirement data. The method 600 can be performed by the resource management system 116, resource management system 316, and/or any other system, apparatus, or device discussed herein. The method 600 can include a block 602 where data corresponding to the movement of people within a building located in a micro-grid of a city is received. The data can be provided by a network of luminaires located within the building and/or outside of the building. At block 604, a pattern of the movement is identified by analyzing the data over a period of time. At block 606, a lighting requirement for the building can be predicted based on the identified pattern. For example, when the identified pattern is a static pattern, the lighting requirement can be predicted by calculating a density of persons in the building. In this way, a higher lighting requirement may be necessary when the building is more densely packed, and a lower lighting requirement may be necessary when the building is less densely packed. The density of persons in the building can be a ratio of the number of persons predicted to be in the building over a total available occupancy of the building. At block 608, the energy requirement for the micro-grid can be estimated based on the lighting requirement estimate for the building. The energy requirement for the micro-grid can be estimated by determining an amount of power necessary to power the building according to the lighting requirement and scaling the determined amount of power for the entire micro-grid. Scaling the determined amount of power can be performed by multiplying the determined amount of power by a ratio of an estimate for the number of persons in the micro-grid over the number of persons in the building. At block 610, energy resources available for powering the micro-grid are characterized according to their ability to power the micro-grid according to the pattern of the movement of people. For example, a power source that consumes the least amount of energy during startup of the power source (e.g., a battery or other charge storage device) can be characterized as being suitable for providing power during an instantaneous mobility pattern of persons. At block 612, an energy source is assigned to the micro-grid according to the movement of the people and the characterization of the energy resource. For example, if the movement of the people corresponds to an instantaneous mobility pattern of people, a battery energy resource can be assigned to power the micro-grid in order to conserve energy that might be wasted when initializing a different energy source such as a fossil fuel source.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

The invention claimed is:

1. A method for powering a micro-grid comprising:
by a computing device:
collecting location data of people moving in one or more micro-grids of an area;
predicting a mobility pattern of a population of people in the one or more micro-grids based on the location data of people;
estimating an energy requirement for the one or more micro-grids based at least on the predicted mobility pattern;
ranking the estimated energy requirements for the one or more micro-grids based on the mobility pattern;
classifying energy resources based the ability to power the one or more micro-grids according to different types of predetermined mobility patterns, selected from at least an instantaneous mobility pattern, a dynamic mobility pattern, and a static mobility pattern;
selecting one or more energy resources suitable for satisfying the energy requirement of the one or more micro-grids during a time corresponding to the mobility pattern, based on the ranking of the one or more micro-grids and the classification of the energy resource; and
powering, using the selected one or more energy resources, the micro-grid during the time corresponding to the predicted mobility pattern.

2. The method of claim 1, further comprising:
receiving sensor data from a network of luminaires located within the micro-grid, wherein the mobility pattern is predicted using the sensor data and the micro-grid is a power system in a building located in the area.

3. The method of claim 1, wherein the predicted mobility pattern is an instantaneous mobility pattern associated with a disruptive event that is predicted by the computing device using data available to the computing device, and the identified energy resource is a renewable energy resource.

4. The method of claim 3, wherein the instantaneous mobility pattern corresponds to a period when the population of the micro-grid increases and then decreases.

5. The method of claim 1, further comprising:
predicting mobility patterns of populations of people in multiple micro-grids of the area;
estimating energy requirements for the multiple micro-grids based on the predicted mobility patterns; and
ranking the estimated energy requirements for the multiple micro-grids.

6. The method of claim 5, further comprising:
selecting, based on the ranking, energy resources to fulfill the energy requirements for the multiple micro-grids.

7. The method of claim 1, wherein the mobility pattern of the population is predicted based at least in part on: call detail records received from one or more telecommunications providers, or sensor data transmitted by sensors connected to a network of luminaires.

8. A non-transitory computer readable medium configured to store instructions that when executed by one or more processors of a computing device, cause the computing device to perform steps that include:
collecting location data of people moving in one or more micro-grids of an area; predicting mobility patterns of populations of people in the one or more micro-grids based on the location data of people;
estimating an energy requirement for the one or more micro-grids of the different micro-grids based on the predicted mobility patterns;
classifying energy resources based the ability to power the one or more micro-grids according to different types of mobility patterns, selected from at least an instantaneous mobility pattern, a dynamic mobility pattern, and a static mobility pattern;
generating a ranking of energy requirements for the one or more micro-grids;
selecting one or more energy resources suitable for satisfying the energy requirements of the micro-grid during a time corresponding to the mobility pattern, based on the ranking of the one or more micro-grids and the classification of the energy resource; and
powering, using the selected energy resources, the one or more micro-grids during the time corresponding to the predicted mobility pattern.

9. The non-transitory computer readable medium of claim 8, wherein the steps further include:
causing a first energy source to power a first micro-grid of the area and a second energy source, that is different than the first energy source, to power a second micro-grid of the area.

10. The non-transitory computer readable medium of claim 9, wherein the first energy source is a solar energy source and the second energy source is a fossil fuel energy source.

11. The non-transitory computer readable medium of claim 8, wherein the mobility patterns include a static mobility pattern and an instantaneous mobility pattern.

12. The non-transitory computer readable medium of claim 8, wherein the predicted mobility patterns are based on sensor data received from sensors located in different micro-grids, and the energy requirement is based on an estimated lighting requirement for an area of each micro-grid.

13. The non-transitory computer readable medium of claim 12, wherein the sensor data includes global positioning data associated with devices located in the micro-grids.

14. The non-transitory computer readable medium of claim 8, wherein the steps further include:
estimating a lighting requirement for each micro-grid of the different micro-grids, wherein the energy requirement for each micro-grid is based on the estimated lighting requirement for each micro-grid.

15. A computing system for controlling energy resources available to different micro-grids of an area, the computing system comprising:
a processor in communication with a tracking network for collecting mobility data of persons in a micro-grid of the area, wherein the mobility pattern estimator is configured to predict a mobility pattern using the mobility data, said processor configured to use the predicted mobility pattern to estimate an energy requirement for the micro-grid, classify energy resources based the ability to power the one or more micro-grids according to different types of mobility patterns, selection from at least an instantaneous mobility pattern, a dynamic mobility pattern, and a static mobility pattern, and generate a ranking of energy requirements for the one or more micro-grids, select an energy resource suitable for satisfying the energy requirement of the one or more micro-grids during a time corresponding to the predicted mobility pattern, based on the ranking of the one or more micro-grids and the classification of the available energy resource, and power, using the selected energy resource, the micro-grid during the time corresponding to the predicted mobility pattern.

* * * * *